(12) United States Patent
Hauenstein

(10) Patent No.: US 6,953,281 B2
(45) Date of Patent: Oct. 11, 2005

(54) METHOD FOR DETERMINING TEMPERATURES ON SEMICONDUCTOR COMPONENTS

(75) Inventor: Henning M. Hauenstein, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/311,950
(22) PCT Filed: Apr. 18, 2002
(86) PCT No.: PCT/DE02/01436
§ 371 (c)(1), (2), (4) Date: Mar. 14, 2003
(87) PCT Pub. No.: WO02/086432
PCT Pub. Date: Oct. 31, 2002

(65) Prior Publication Data
US 2003/0161380 A1 Aug. 28, 2003

(30) Foreign Application Priority Data
Apr. 21, 2001 (DE) .......... 101 19 599

(51) Int. Cl.⁷ .......... G01K 11/00; G01J 5/00
(52) U.S. Cl. .......... 374/161; 374/121
(58) Field of Search .......... 374/161, 120, 374/121, 131, 127, 159, 130

(56) References Cited

U.S. PATENT DOCUMENTS

| | | | | |
|---|---|---|---|---|
| 4,430,897 A | * | 2/1984 | Quate | 374/5 |
| 4,525,066 A | * | 6/1985 | Guillaume et al. | 374/161 |
| 4,632,561 A | * | 12/1986 | Rosencwaig et al. | 374/57 |
| 4,640,626 A | * | 2/1987 | Schmid et al. | 374/161 |
| 4,679,946 A | * | 7/1987 | Rosencwaig et al. | 374/57 |

(Continued)

FOREIGN PATENT DOCUMENTS

| GB | 2262983 | 7/1993 | |
|---|---|---|---|
| JP | 53087783 A | * 8/1978 | G01J/5/60 |
| JP | 57101728 A | * 6/1982 | G01J/5/52 |
| JP | 61084528 A | * 4/1986 | G01J/5/00 |
| JP | 03252536 A | * 11/1991 | G01K/11/12 |

OTHER PUBLICATIONS

In–Situ, Contactless and Non–Destructive Measurement of the Temperature Variation over the Surface of a Silicon Wafer, IBM Technical Disclosure Bulletin, vol. 28, No. 9, Feb. 1986, pp. 4004–4005, ISSN: 0018–8689.*

Primary Examiner—Gail Verbitsky
Assistant Examiner—Mirellys Jagan
(74) Attorney, Agent, or Firm—Kenyon & Kenyon

(57) ABSTRACT

A method and a device for determining temperatures on semiconductor components are provided. In order to determine a temperature on a semiconductor component, a scanning light wave is irradiated onto a measuring point on the semiconductor component. Next, a response light wave reflected from the measuring point is recorded. Then, the temperature of the measuring point is ascertained with the aid of a temperature-dependent property R of the response light wave.

17 Claims, 3 Drawing Sheets

U.S. PATENT DOCUMENTS

| | | | | |
|---|---|---|---|---|
| 4,710,030 A | * | 12/1987 | Tauc et al. | 374/57 |
| 4,729,668 A | * | 3/1988 | Angel et al. | 374/161 |
| 4,956,538 A | * | 9/1990 | Moslehi | 374/161 |
| 5,102,231 A | * | 4/1992 | Loewenstein et al. | 374/129 |
| 5,156,461 A | * | 10/1992 | Moslehi et al. | 374/121 |
| 5,208,643 A | * | 5/1993 | Fair | 356/43 |
| 5,228,776 A | * | 7/1993 | Smith et al. | 374/5 |
| 5,250,809 A | * | 10/1993 | Nakata et al. | 374/124 |
| 5,263,776 A | | 11/1993 | Abraham et al. | |
| 5,314,249 A | * | 5/1994 | Marui et al. | 374/128 |
| 5,326,173 A | * | 7/1994 | Evans et al. | 374/161 |
| 5,388,909 A | * | 2/1995 | Johnson et al. | 374/161 |
| 5,422,498 A | * | 6/1995 | Nikawa et al. | 374/45 |
| 5,467,732 A | | 11/1995 | Donnelly et al. | |
| 5,474,381 A | * | 12/1995 | Moslehi | 374/161 |
| 5,501,637 A | * | 3/1996 | Duncan et al. | 374/126 |
| 5,645,351 A | * | 7/1997 | Nakata et al. | 374/161 |
| 5,683,180 A | * | 11/1997 | De Lyon et al. | 374/161 |
| 5,755,512 A | * | 5/1998 | White | 374/161 |
| 5,803,606 A | * | 9/1998 | Petry et al. | 374/161 |
| 6,146,014 A | * | 11/2000 | Bruce et al. | 374/161 |
| 6,168,310 B1 | | 1/2001 | Kurosaki et al. | |
| 6,168,311 B1 | * | 1/2001 | Xiao et al. | 374/161 |
| 6,174,081 B1 | * | 1/2001 | Holm | 374/161 |
| 6,428,202 B1 | * | 8/2002 | Mitsuhashi et al. | 374/5 |
| 2002/0131476 A1 | * | 9/2002 | Baba et al. | 374/161 |

* cited by examiner

METHOD FOR DETERMINING TEMPERATURES ON SEMICONDUCTOR COMPONENTS

FIELD OF THE INVENTION

The present invention relates to a method and a device for determining temperatures on semiconductor components.

BACKGROUND INFORMATION

In the field of semiconductor technology, the performance of a component depends strongly, among other things, on its admissible operating temperatures. A very frequent cause of failure is temperatures that are too high during operation, which are able to damage the component severely or completely destroy it. Therefore, both for the user who has to select suitable semiconductor components for a certain application, and for a manufacturer who has to make specifications for the development of such an element, and also for the manufacturer who specifies his product, the knowledge of the temperature of the component, which sets in under certain usage conditions, is of great interest.

Other systems characterize the temperature of a semiconductor component via the so-called barrier layer temperature $T_j$, which may be determined, for example, by measuring the forward voltage of pn junctions of a component. (These are junctions between p-doped and n-doped areas of a semiconductor; they are, for instance, components of rectifier and Zener diodes or are present in the form of an intrinsic body diode of a field-effect transistor). In this context, one makes use of the fact that the voltage $U_{flow}$, which has to be applied to a pn junction in the flow direction in order to let a certain current I flow, is a function of the crystal temperature at the location of the pn junction. Via the functional connection $U_{flow}(I, T_j)$, by measuring the forward voltage $U_{flow}$ for a given current flow I, one may conclude what temperature $T_j$ is.

However, for this one has to know the function $U_{flow}(I, T_j)$, which is generally ascertained by a preceding stationary calibration measurement of $U_{flow}(I, T_j)$.

According to the conventional method, measuring current I is sent via the component in flow direction. This method may not be used as long as another operating state of the component prevents this forward current (e.g. during an avalanche breakdown or the like). In addition, in complex integrated circuits the problem may arise that, in general, the transmission states of different semiconductor junctions in the component are not able to be set completely independently of one another. Therefore, the case may arise in which there is an interest in measuring the temperature of a certain pn junction which, however, under normal operating conditions of the component is transparent only transiently. In such a case it is not possible to perform ahead of time a stationary calibration at the pn junction.

These peculiarities of the conventional method lead to the method not being usable, for example, for the investigation of the barrier breakdown (avalanche effect) of a diode. The avalanche state is characterized in that, in the reverse direction, such a high voltage is present that the diode breaks down and a large current flows in the reverse direction (so-called Zener breakdown of a diode). The high fields and currents in general lead to strong heating of the component, the hottest spot is at the pn junction breaking down. In order to determine the temperature prevailing there, using the conventional forward voltage method, one has to wait, however, until the barrier current has decayed almost completely, in order then to conduct a measuring current through the pn junction in the opposite direction. The result of this is that the conventional method is first able to be used after a certain time delay after the decay of the Zener breakdown. The temperature present at this point in time, to be sure, no longer corresponds to the temperature spike at the pn junction that appears during the breakdown, but mostly to a clearly lower temperature, because, between the end of the avalanche state and the beginning of the measurement, the heat may distribute itself already from the region of the pn junction to a larger region of the component or even to the thermally interfaced environment of the component. However, in general it is the transient temperature spikes which lead to damage of the component.

To be sure, the possibility exists of gaining insight concerning the temperature development in the semiconductor component by following the development over time of the forward current after a Zener breakdown, and, by extrapolating this development to points in time before the measurement, of coming to a conclusion on the temperature which could have been prevalent at the time of the breakdown at the interface. However, this method is encumbered with considerable uncertainties. One reason for this is the shortness of the measuring times available and thus the limited accuracy of the temperature measurement which is the more extreme the higher the required temporal resolution; for another reason, there is a fundamental problem in that, by the forward current measurement, only one average value of the temperature is able to be ascertained over the entire surface of the pn junction, but that it is not at all certain that the avalanche current, and thus the temperature distribution in the avalanche state, is uniformly distributed over the junction surface.

SUMMARY

A method and a device for determining temperatures at semiconductor components are provided in accordance with the present invention, which make possible a measurement at any time, independent of an operating state prevalent at a semiconductor junction. The present invention may provide that it makes possible a temperature measurement having a spatial resolution, using which even irregular current strength distributions may be recorded at a semiconductor junction with the aid of temperatures resulting therefrom. The measurement may be made in time resolution, the resolution is in the millisecond range and below.

The present invention provides a method for determining a temperature at a semiconductor component including the steps of irradiating a scanning light wave on a measuring point on the semiconductor component, recording a response light wave reflected from the measuring point, and recording the temperature of the measuring point with the aid of a temperature-dependent property of the response light wave. Also, the present invention provides a device for determining a temperature at a semiconductor component, using a light source for irradiating a scanning light wave onto a measuring point on a semiconductor component, using a light-sensitive element for recording a temperature dependent property of the response light wave and a processing unit for converting a recorded value delivered by the light-sensitive element into a temperature.

The conversion of an instantaneous value recorded by the light-sensitive element of the temperature-dependent property into a temperature is made by a comparison with values of a reference curve which describes the property as a function of the temperature.

Such a reference curve is expediently acquired ahead of time under thermally static conditions. In order to be able to acquire the reference curve at the same component at which the measurement is also taken later, under identical conditions, the device according to the present invention is expediently furnished with an oven, using which, the temperature of the semiconductor component may be regulated in a stationary manner at a desired value.

Since temperature-dependent properties of the semiconductor component, such as linear or nonlinear reflection coefficients, index of refraction, absorption coefficient, etc, may vary from place to place, corresponding to the functional structures developed on the semiconductor component, the reference curve is acquired in each case for a single measuring point of the semiconductor component. Expediently, a small surface section or boundary area section of the semiconductor component, which has a homogeneous structure, is selected. At this measuring point of the same semiconductor component or of an element constructed in the same manner, the measurements of the heating up of the semiconductor component induced by the operating current flow are then acquired.

One may define several such measuring points on a semiconductor component, and reference curves may be acquired for such measuring points which belong to different pn junctions or even to regions, separated in space, of a similar pn junction.

On an unpackaged component or one exposed from its packaging, the temperature distribution at the surface may thus be, so to speak, "mapped".

If only a few temperature measuring points are needed, it may be sufficient to expose these by making a small bore hole of a few square millimeters in cross section in the packaging.

A sufficiently intense monochromatic light source, e.g., a laser beam, is used as the scanning light wave. Sufficiently intense means that the light has to be intense enough so that the response signal may be interpreted. An excessively high intensity would, under certain circumstances, heat up the component and invalidate the measurement, in case the radiation were correspondingly absorbed.

The response light source may then be recorded at the frequency of the scanning light wave; at sufficient intensity of the scanning light wave, it is also possible to record the harmonics when there are multiples of the frequency of the scanning light wave. When two monochromatic scanning light waves are used, the response light source may also be recorded by using the sum or the difference of the frequencies of the two scanning light waves. Such a procedure makes possible an increase in intensity of the response light wave by tuning at least one scanning light wave to a resonance of the material of the component.

The response light wave may be recorded in the Fresnel reflection direction of the scanning light wave, but it is also conceivable to evaluate a response light source which is scattered nondirectionally in other spatial directions than the Fresnel reflection direction.

A wavelength is selected for the scanning light wave to which the substrate material of the semiconductor component is transparent. In this manner, it is avoided, on the one hand, that, by the absorption of the scanning light wave in the semiconductor component, the latter is heated and that the measuring result is thereby invalidated, and on the other hand, that, by the immission of the scanning light wave, tree charge carriers are induced in the semiconductor material, which might affect the switching performance of the semiconductor component. Semiconductor materials generally have transparent ranges in the near infrared at wavelengths above 1 μm.

DETAILED DESCRIPTION

Figure 1:
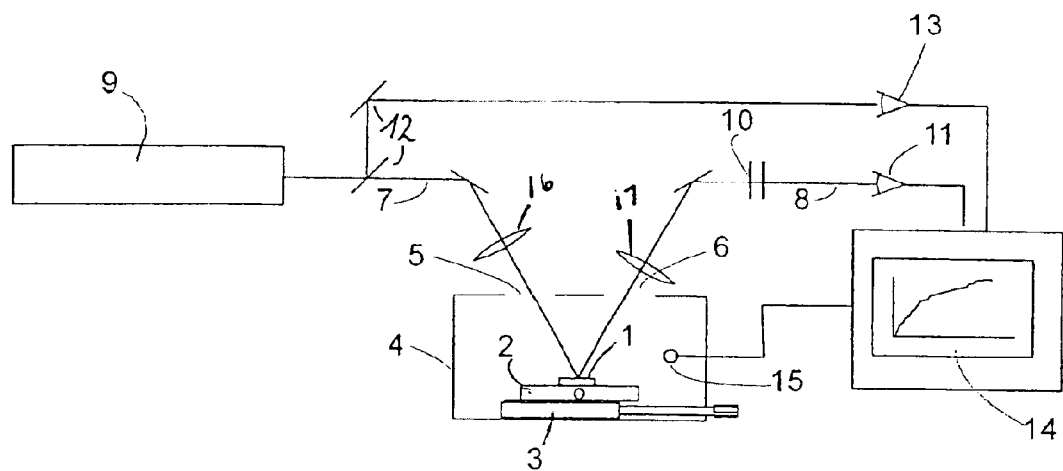
FIG. 1 illustrates a schematic view of the measuring device according to the present invention.

FIG. 1 illustrates a schematic view of the measuring device according to the present invention for determining temperatures at a semiconductor component 1. In the device illustrated here, semiconductor component 1 is arranged on an arrangement of relocating stages 2, 3 positioned displaceably in two perpendicular directions to the exposed surface of component 1 (with reference to the figure in the horizontal direction and perpendicularly to the plane of the drawing). Component 1 is surrounded by a thermostatically regulated oven 4 which includes an entrance window and an exit window 5, 6 for a scanning light wave 7 and a response light wave 8. As light source for generating the scanning light wave a laser 9 is used, such as a solid-state laser in which rare earth ions are used as laser-active species. Depending on the kind of ions used and their carrier crystal, such lasers may have wavelengths in the range of about 1.0–1.5 μm.

Scanning light wave 7 generated by laser 9 is guided to a measuring point on the surface of semiconductor component 1; response light wave 8 starting from there runs through a filter 10 and is picked up by a light-sensitive element 11, such as a PIN photodiode, a pyroelectric detector or the like. Filter 10 is used for screening light-sensitive element 11 from the surrounding light. Depending on the intensity of the scanning light wave expected, filter 10 may be a colored glass filter or an interference filter, but under certain circumstances, which are discussed in greater detail below, the use of a grating monochromator may be required.

A beam portion split from scanning light wave 7 by a beam splitter 12 is guided to a second light-sensitive element 13.

An evaluation and processing unit 14 is connected to both light-sensitive elements 11, 13 for calculating the ratio of the intensities of the waves picked up by the two light-sensitive elements, and thus to ascertain the reflection coefficient R of the measuring point. Furthermore, a temperature sensor 15 is connected to an evaluation and processing unit 14, which is used for recording the temperature on the inside of oven 4.

In a first phase of the method according to the present invention, a reference curve is generated which illustrates the dependence of the reflection coefficient of the surface of semiconductor element 1 on its temperature. For this purpose, oven 4 is slowly heated together with semiconductor component 1 present in it, and during the heating, reflection coefficient R of the surface is ascertained by forming the relationship of the intensity signals delivered by the light-sensitive elements 11, 13, and is stored in a memory of evaluation/processor unit 14, as a function of temperature T prevailing in each case in oven 4 at the point in time of the ascertainment.

If the surface of semiconductor component 1 is structured and has a different reflection coefficient from location to location, such a reference curve is acquired for a plurality of measuring points at which temperature measurements are to be performed later under operating conditions of the semiconductor component.

As the first example for the application of the reference curve for ascertaining a temperature of semiconductor component 1 and the operating conditions, the case is considered in which these operating conditions are stationary. In this case it is sufficient to irradiate scanning light waves 7 onto semiconductor component 1 under the exact same geometrical conditions as during the acquisition of the reference curve, and to pick up response light wave 8 reflected from its surface in order to compare its temperature-dependent intensity with the intensity picked up by light-sensitive element 13. The comparison yields a reflection coefficient R which, with the aid of the reference curve, may be clearly associated with a temperature of semiconductor component 1.

Figure 2:
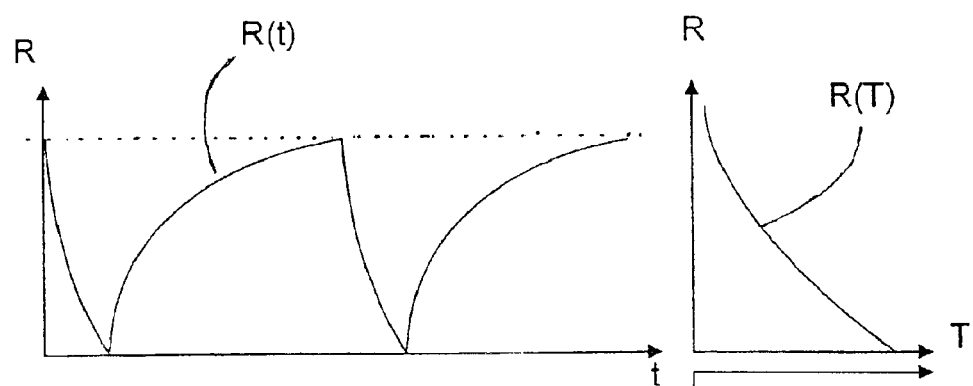
FIG. 2 illustrates an example of the development over time of the reflectivity of the surface of a semiconductor element and the development of the temperature ascertained therefrom.

It is true that with the use of this method only slow temperature changes of semiconductor component 1 are able to be recorded. However, to a developer and user of semiconductors the knowledge is meaningful of temperatures which may occur transiently during the course of a switching operation, that is, in the non-stationary operation of the component. One principle of the recording of such transient temperature patterns is illustrated in FIG. 2. In order to measure a temperature pattern on semiconductor 1, a switching operation which leads to heating up is repeated cyclically. FIG. 2 illustrates, in a first partial diagram, as curve R(t) the pattern of reflectivity R as a function of time t, over two switching cycles. Actually, the reflectivity is not measurable with the accuracy of the curves illustrated, but is strongly noise-infested, so that expediently, with the aid of a lock-in amplifier, which may be a part of evaluation and processing unit 14, and which is coupled to the switching cycle of component 1, an average curve of reflectivity R is ascertained during the course of one cycle, which is subsequently converted with the aid of reference curve R(T) into a time-dependent curve of temperature T(t).

This procedure is suitable for use for the scanning wave in conjunction with a continuous light source.

Figure 3:
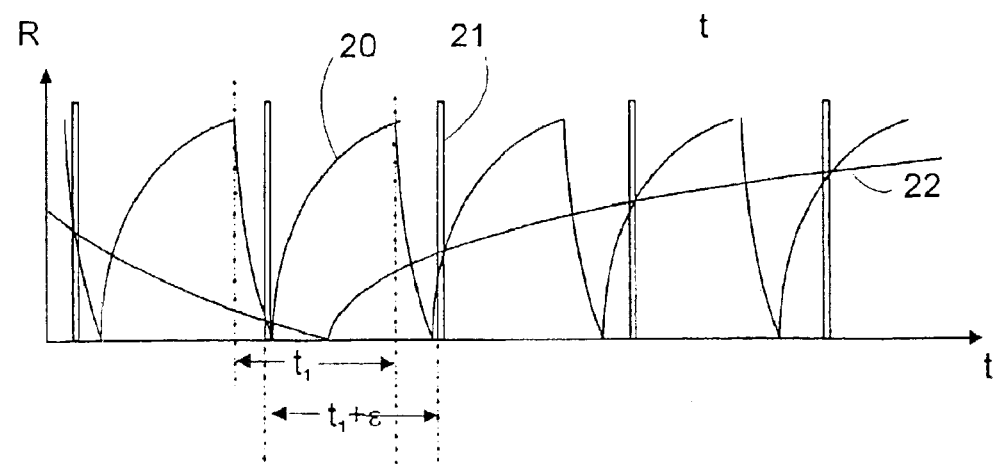
FIG. 3 illustrates a measuring method which is suitable for use as a light source using a pulsed laser.

FIG. 3 illustrates a measuring method which is suitable for use as a light source using a pulsed laser. In FIG. 3 three curves are illustrated, respectively superimposed. A first curve 20 illustrates reflectivity R of the surface of semiconductor component 1 as a function of time t. The curve repeats in each operating cycle of the semiconductor component for a duration of $t_1$. A second curve 21 illustrates the time-dependent intensity of the pulsed laser, and its period $t_1+\epsilon$ differs by a very small, non-vanishing value $\epsilon$ from period $t_1$ of the operating cycle. In the figure this difference $\epsilon$ is illustrated in an exaggerated fashion, in order to make clear the manner in which, during the course of time t, the position of the laser pulses of curve 21 shifts with respect to the operating cycle of component 1.

With each laser pulse, curve 20—in respectively different cycles—is scanned using a different phase relation, and a scanning value for the reflection coefficient is obtained which in each case corresponds to another phase relation of cyclical curve 20. The result of the scanning values thus obtained yields a curve 22, whose pattern, on a stretched time scale, corresponds to the pattern of reflectivity curve 20 in each individual cycle. By selection of the value $\epsilon$ in the order of magnitude of the laser pulse duration, the factor of the stretching may be determined; one may achieve a temporal resolution of the reflectivity measurement corresponding to the duration of the laser pulse.

In the description so far it was assumed that the response light wave, which is picked up and evaluated for ascertaining of the temperature, comes about from the scanning light wave by reflection at the surface of the semiconductor component according to the classical laws of Fresnel optics. This does not necessarily have to be the case. Thus, for example, it is conceivable that one might not pick up the reflected ray as the response light wave, but rather light which is diffusely reflected at the surface of component 1.

It may also prove expedient, instead of using, as usual, linear reflected light, to take advantage of nonlinear optical phenomena at the surface, or even at another boundary area of the semiconductor component. A possibility for this is frequency doubling at the surface. Optical frequency doubling or, more generally, sum and difference frequency mixing are nonlinear optical procedures which are able to occur in media that are not inversion-symmetrical. In the case of the usual semiconductor materials, a break in the inversion symmetry exists only at boundary surfaces. That is why sum and difference frequency mixing occurs exclusively at boundary surfaces. But it is the boundary surfaces, e.g. between differently doped zones in the semiconductor component or between the semiconductor substrate and a metallization, whose temperatures are important to know, in order to be able to optimize the power-handling capacity of semiconductor components, and also to be able to optimize models which permit simulating temperature distributions in a semiconductor component computationally.

Figure 4:
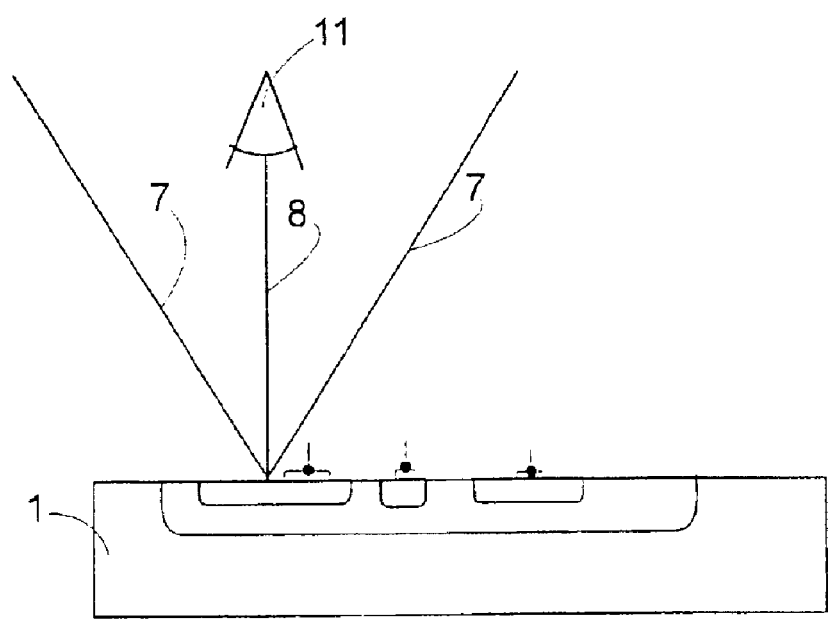
FIG. 4 illustrates the spatial pattern of the scanning and response light wave in a case in which the second harmonic of the scanning light wave is recorded as the response light wave.

An advantageous variant of beam control at semiconductor component 1 while using the second harmonic as response light wave 8 is illustrated in FIG. 4. Here, scanning light wave 7, at two equal and opposite angles to the normal to the surface, hits a measuring point at the surface of semiconductor component 1. Due to the nonlinear interaction of the light coming in from two different directions with the semiconductor surface, frequency-doubled light is created which is radiated, concentrated in part, in the direction of the normal to the surface. This response light wave is practically free from background having the frequency of the scanning light wave. Due to this, although the intensity of the frequency-doubled response light wave is smaller by several orders of magnitude than the scanning light wave, the response light wave, possibly with the use of further filters or a monochromator, may be detected, separated from the background and with the aid of a photomultiplier as light-sensitive element 11.

According to another further refinement, a polarizer 17 may be provided in the optical path of the scanning light wave, independently of whether it is a light wave at the frequency of the scanning light wave or a harmonic thereof, in order to record the intensity of the response light wave as a function of the polarization. If laser 9 supplies polarized light, this polarizer may be oriented orthogonally to the direction of polarization, in order only to record a depolarized component in the light reflected by component 1 as response light wave, and thus to suppress a major portion of the intensity of the reflected light. If a non-polarized light source is used, a second polarizer 16 for polarizing the scanning light wave may of course be inserted between the light source and the surface of the semiconductor component.

Figure 5:
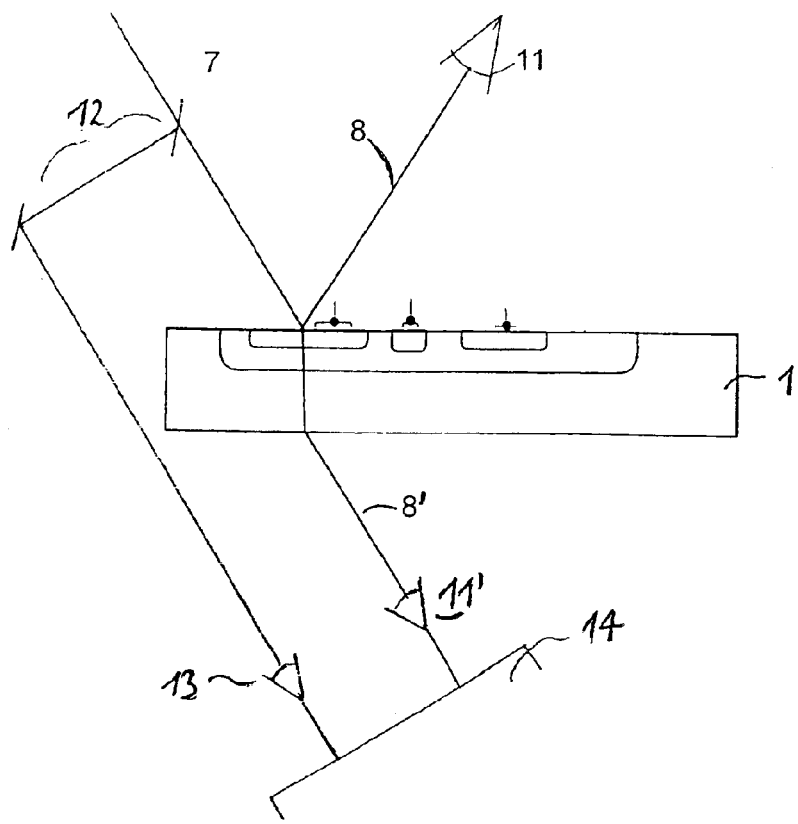
FIG. 5 illustrates the spatial pattern of the scanning light wave and the response light wave when the classically reflected or the transmitted scanning light wave is recorded as the response light wave.

In the present description we have assumed that response light wave 8 is emitted at the surface of semiconductor component 1 into the half-space from which the scanning light wave hits the surface. As illustrated in FIG. 5, however, there is also the possibility of picking up the portion of scanning light wave 7 transmitted by semiconductor component 1 as response light wave 8', using a light-sensitive element 11', and thus to record the temperature-dependent absorption coefficient of semiconductor material 1. For reflection measurements it may be desirable to select a wavelength of scanning light wave 7 in a range of complete transparency of the semiconductor substrate, for transmission measurements a wavelength is advisable at the edge of the transparency range, so that even minor temperature-dependent changes in the absorption coefficient lead to a measurable intensity change of transmitted response light wave 8'. By using beam splitter 12 and recording the split-off ray in light-sensitive element 13, in evaluation or calculating unit 14, even in the example as in FIG. 5, absolute coefficients may be determined, both the absolute reflection coefficient and transmission coefficients, from the relationship of the signals of the detectors or light-sensitive elements 11' and 13. If one measures reflection and transmission at the same time, this is possible in the case of certain sample geometries and requires a further detector element, that is, altogether three detector elements 11, 11', 13, and then the absorption coefficient of semiconductor material 1 and possibly the refractive index may also be ascertained from the signals received. Both values may be used for the temperature determination, as was described in connection with the example as in FIG. 1.

I claim:

1. A method for determining a temperature on a semiconductor component, comprising:
    irradiating two monochromatic scanning light waves on a measuring point on the semiconductor component;
    recording a response light wave reflected from the measuring point; and
    determining a temperature of the measuring point using a temperature-dependent property of the response light wave;
    wherein the two monochromatic scanning light waves are irradiated and the response light wave is recorded by using one of a sum of frequencies of the two scanning light waves and a difference of frequencies of the two scanning light waves.

2. The method of claim 1, wherein the response light wave is recorded at a frequency of the scanning light waves.

3. The method of claim 1, wherein the response light wave is recorded at a multiple of a frequency of the scanning light waves.

4. The method of claim 1, wherein the temperature-dependent property is one of an intensity of the response light wave and a polarization of the response light wave.

5. The device of claim 1, wherein the temperature-dependent property includes a reflection coefficient.

6. The device of claim 5, wherein the reflection coefficient is non-linear.

7. The method of claim 1, wherein the temperature of the measuring point is determined by comparing an instantaneous value of the temperature-dependent property with a characteristic reference curve of the temperature dependent property.

8. The method of claim 7, wherein the reference curve is established ahead of time under thermally static conditions.

9. The method of claim 7, wherein the reference curve is established for a single measuring point of the semiconductor component.

10. A device for determining a temperature on a semiconductor component, comprising:
    a light source for irradiating two monochromatic scanning light waves onto a measuring point on the semiconductor component;
    a light-sensitive arrangement for recording a temperature-dependent property of a response light wave reflected from the measuring point; and
    a processing unit for converting a recorded value of the temperature-dependent property supplied by the light-sensitive arrangement into a temperature;
    wherein the two monochromatic scanning light waves are irradiated and the response light wave is recorded by using one of a sum of frequencies of the two scanning light waves and a difference of frequencies of the two scanning light waves.

11. The device of claim 10, wherein the processing unit includes a memory for storing at least one reference curve of the temperature-dependent property.

12. The device of claim 10, further comprising an oven for regulating the temperature of the semiconductor component.

13. The device of claim 10, further comprising at least one actuator for shifting the semiconductor component relative to at least one of the light source and the light-sensitive arrangement.

14. The device of claim 10, wherein the light source includes a laser.

15. The device of claim 10, wherein the light-sensitive arrangement includes a photomultiplier.

16. The device of claim 10, for use with a polarizer that is arrangeable between the semiconductor component and the light-sensitive arrangement.

17. The device of claim 10, wherein the light-sensitive arrangement includes at least one of a PIN diode and a pyroelectric detector.

* * * * *